United States Patent [19]

Shirakawa

[11] Patent Number: 4,826,146

[45] Date of Patent: May 2, 1989

[54] HYDRAULIC CLAMP

[75] Inventor: Tsutomu Shirakawa, Hyogoken, Japan

[73] Assignee: Kabushiki Kaisha Kosmek, Hyogoken, Japan

[21] Appl. No.: 119,894

[22] Filed: Nov. 12, 1987

[30] Foreign Application Priority Data

Nov. 12, 1986 [JP] Japan .......... 61-174603[U]
Nov. 17, 1986 [JP] Japan .......... 61-177285[U]
Nov. 29, 1986 [JP] Japan .......... 61-184349[U]

[51] Int. Cl.$^4$ .......... B23Q 3/08

[52] U.S. Cl. .......... 269/32; 269/94; 269/234; 269/93

[58] Field of Search .......... 269/24, 32, 35, 234, 269/91, 93, 94, 224

[56] References Cited

U.S. PATENT DOCUMENTS

| | | | |
|---|---|---|---|
| 4,365,792 | 12/1982 | Johns | 269/32 |
| 4,504,046 | 3/1985 | Yonezawa et al. | 269/93 |
| 4,506,871 | 3/1985 | Yonezawa | 269/32 |

*Primary Examiner*—Robert C. Watson
*Attorney, Agent, or Firm*—Lowe, Price, LeBlanc, Becker & Shur

[57] ABSTRACT

A hydraulic clamp for dies of injection molding machines, workpieces of machine tools such as press machines and the like.

In the front part of its housing a clamp arm is installed to be longitudinally movable and vertically pivotable and a hydraulic cylinder in the rear part thereof, and there is formed in at least either of a piston rod and the clamp arm a longitudinally extending hole for accommodating a clamp arm pushing spring. An engaging means is provided for engaging the clamp arm with the piston rod at substantially same level with the clamp arm pushing spring. When the hydraulic cylinder is driven to extend, first the clamp arm is pushed forward by the clamp arm pushing spring and, when it is extended, a projected end portion of the clamp arm is pivoted down by the force-magnifying effect of a driving wedge interlockingly connected with the piston rod. When the hydraulic cylinder is driven to retract, first the driving wedge withdraws to allow the clamp arm to pivot upward and then it retracts accompanying the piston rod via the engaging means.

Also provided is a clamping force holding spring set in a clamping hydraulic chamber pre-assembled with a longitudinally extendable/retractable rod.

Another function provided is to detect the extended or retracted condition of the clamp arm, which is feasible by connecting interlockingly rods for detecting the position of the clamp arm and trigger either limit switch accordingly.

9 Claims, 6 Drawing Sheets

HYDRAULIC CLAMP

BACKGROUND OF THE INVENTION

The present invention relates to a hydraulic clamp for a die of an injection molding machine or a workpiece of a machine tool such as a press machine, and more concretely to a hydraulic clamp capable of securely holding the object to be clamped with a large clamping force and, at the time of unclamping, having its clamp arm retracted so as not to interfere with bringing in or out of the object to be clamped.

Hitherto, as hydraulic clamps of this type there have been known, among others, the cited prior art proposed earlier by the present inventor and disclosed in U.S. Pat. No. 4,504,046 and another prior art described in Japanese Laid-Open Utility Model Application No. 51835/'83. These prior art disclosures are substantially the same as far as the basic construction is concerned. Referring to FIGS. 8 and 9, the basic construction or concept of the U.S. Pat. No. 4,504,046 is as follows.

In a clamp housing 201 a drive chamber 203 is formed with its front end open. Into this drive chamber 203 a clamp arm 204 is inserted to be longitudinally movable and vertically pivotable therein. A fulcrum portion **204*a* is formed near the end of the bottom of the clamp arm and a driven face or portion 204*b* is provided in the front part of the top of the clamp arm 204. A clamping portion or face 204*c* is on the underside of the front stepped part thereof. A stopper 211 for arresting the clamp arm 204 at the front end of its stroke is formed near the bottom of the clamp housing 201. A wedge 217 is inserted between the driven face 204*b* and the top of the drive chamber 203. A hydraulic cylinder 205 is formed to extend forward in the rear upper part of the clamp housing 201. The driving wedge 217 is made longitudinally drivable by a piston rod 226 of the hydraulic cylinder 205. An engaging portion 231 for causing the clamp arm to be pulled back after withdrawal of the driving wedge 217 by the predetermined dimension is provided as a means of engagement of the piston rod 226 with clamp arm 204. The clamp arm 204 is pushed forward by a clamp arm pushing spring 232, so that, when the hydraulic cylinder 205 is driven to extend, the clamp arm 204 is pushed forward by the force of the clamp arm pushing spring 232 for the clamping portion 204*c* to be extended beyond the front end of the drive chamber 203. The extended clamping position A is reached as, with the clamp arm 204 arrested by the stopper 211, the driven face 204*b* is driven downward by the driving wedge 217, while, when the hydraulic cylinder 205 is retracted, first the driven face 204*b* is released as the driving wedge 217 withdraws with the clamp arm 204 kept pushed forward by the clamp arm pushing spring 232 at a lower level and then, after the retracting piston rod 226 has come into engagement with the clamp arm 204 via the engaging portion 231, the clamp arm 204 is pulled back by the piston rod 226 to the unclamping retracted position B inward of the front end of the drive chamber 203**.

In the above basic construction the hydraulic clamps of the above-identified prior art are based on the following concept. (1) Structural concept to push the clamp arm 204 by the clamp arm pushing spring 232 to extend beyond the front end of the clamp housing 201.

According to the concept, the clamp arm pushing spring 232 was set between the rear end of the clamp arm 204 and the rear wall **203*a* of the drive chamber 203, and the engaging portion 231 required to have the clamp arm 204 pulled back by the piston rod 226 was provided in the form of a stepped end portion in the top of the clamp arm 204 coming into engagement with the rear end of the driving wedge 217 fixedly secured to the piston rod 226**.

The above-described construction, however, has the following defects.

(a) Since, when the clamp arm 204 retracts, the force of the clamp arm pushing spring 232 acts against the hydraulic cylinder 205 driven to retract; it is therefore necessary to increase the effective cross-sectional area of the unclamping hydraulic chamber 223 to sufficiently overcome the spring force. This results in lowering of the speed of the piston 221 driven relative to the flow rate of pressure oil supplied to the unclamping hydraulic chamber 223. It also interferes with the desired quick retraction of the clamp arm 204, reducing the working efficiency thereof.

(b) While in the course of retraction the clamp arm 204 is kept pushed forward by the clamp arm pushing spring 232 in the vertically middle part, it is pulled back in the upper part via the engaging portion 231, this resulting in lifting or pivoting up of the clamp arm 204 via the engaging portion 231, which means distortion to interfere with smooth retraction of the clamp arm 204. This can be prevented by increasing the guide ratio of the clamp arm 204, but this means prolongation of the clamp arm 204 as well as increase of the overall length of the hydraulic clamp. This also means decrease of the maximum allowable dimensions of die D, workpiece or the like to be clamped to the fixing-plate P.

(c) Since the clamp arm pushing spring 232 remains extended while shifting is made from the extended clamping position A to the extended unclamping position C as shown in FIG. 10 by the broken line, the force of the clamp arm pushing spring 232 is kept at the level of $F_1$, i.e. the level when the clamp arm 204 has reached the front end of its stroke. While shifting from the extended unclamping position C to the unclamping retracted position B is completed, the clamp arm pushing spring 232 is progressively compressed as the clamp arm 204 retracts, its pushing force increases steadily to reach the level $F_2$ at the start of pushing the clamp arm 204.

Thus, the level $F_1$ when the spring is fully extended is lower than $F_2$ at the start of pushing, hence the clamp arm pushing spring 232 is required to be quite powerful, and it becomes inevitably bulky.

Although its basic construction is somewhat different from that of the hydraulic clamp described above, there is disclosed in U.S. Pat. No. 4,506,871 a hydraulic clamp of the type in which a clamp block is extended and retracted by the piston rod of a hydraulic cylinder.

This arrangement has its piston rod inclined to be thinner toward its front end to form a slide face thereon, this slide face has formed therein a longitudinally extending groove, the clamp block is fitted in this groove to be longitudinally slidable freely therein and a block pushing spring is set between the clamp block and the piston rod. Now referring to the extending stroke of the piston rod, during a first portion of the stroke the clamp block is pushed forward by the force of the pushing spring, and at the end of the first portion the clamp block is arrested by a stop means and thereby, during a final portion of the extending stroke of the piston rod, the clamp block and the stop means are both forced down. Meanwhile, it is so arranged that during the final portion of the retracting stroke of the piston rod the clamp block is caused to retract by means of an engaging portion comprising mating and engaging parts of the piston rod and the clamp block. This engaging portion is provided at a level higher than that of the pushing spring set.

In this arrangement, however, the clamp block is pushed back via the above-mentioned engaging portion at a higher level, causing inclination of the clamp block with the front end up. To prevent this, it is necessary to increase the overall length of the clamp block, and thus the above-mentioned defect (b) cannot be overcome. This arrangement also has the following additional defects.

(d) To increase the clamping force of the clamping block, it is essential to make the slope of the slide face on the piston rod more gentle or less steep. This inevitably results in increase of the projecting length of the piston rod relative to the vertical stroke thereof, hence the holding allowance for the object to be clamped such as a die is required to be larger.

(e) When the clamp block and the stop means are lowered by means of the above-mentioned slide face, the forward component of the force applied acts on the clamp housing via the stop means, hence increased is the frictional force between the stop means and the clamp housing. Hence, also increased is the transmission loss of the hydraulic clamp.

(f) Since it is required to form a groove in the inclined slide face of the piston rod, the processing of the piston rod is complicated and, this naturally reflects on the manufacturing cost of the hydraulic clamp.

(g) As the piston rod retracts, synthetic resin powder from injection moulding and cutting chips or shavings from machining or the like can easily find their way into the slide groove and possibly cause malfunction of the clamp block.

A hydraulic clamp of the type in which the clamp block is pushed forward by the force of a pushing spring is disclosed in U.S. Pat. No. 4,365,792.

In the disclosed construction, the clamp block is driven to pivot in the clamping direction by a balance-like mechanism. In the middle part of the clamp block there is formed a hole prolonged longitudinally in sectional view and a fulcrum portion is formed in the top above this hole which serves to guide the clamp block straight forward. And a clamping face or portion is formed in the front part of this clamp block and a driven face in the rear part thereof.

This construction, in which the driven face has to be formed prolonged in the rear part of the clamp block, causes the overall length of the clamp block to be increased and the defect of (b) above cannot be eliminated. Worse, there are the following additional defects.

(h) With a clamp block of the balance type, an upward driving force is applied to the driven face, while the upward reaction of the clamping force is applied to the clamping face or portion. Since the resultant of these forces applied in the same direction is to act on the fulcrum portion, the fulcrum portion is subjected to a large force as well as a high bending moment. A clamp block of this type is, therefore, subjected to a large straining force, hence it is likely to fail.

(i) Since a guide hole for the fulcrum portion has to be formed longitudinally, manufacture of the clamp block is rather troublesome. Moreover, a rod for holding the clamp arm pushing spring and pins pivotally supporting the rod at both ends are required, hence the number of parts is increased and the construction of hydraulic clamp is bound to become complicated. Referring to the FIGS. 8 and 9, the function shown in (2) below was provided in the U.S. Pat. No. 4,504,046.

(2) The function to hold the clamping force of the clamp arm 204 hydraulically driven by a spring force (hereinafter referred to as clamping force holding function).

For this function, it is so arranged that in the clamping hydraulic chamber 222 of the hydraulic cylinder 205 a clamping force holding spring 229 is set between the hydraulic chamber lid 224 and the piston 221 in a compressed and deformed condition so that the clamp arm 204 is held at the extended clamping position A by the clamping force holding spring 229 via the piston 221, and the clamping force holding spring 229 is singly inserted between the spring holding face 221*a* of the piston and the spring holding face 224*a* of the hydraulic chamber lid 224. According to the above-mentioned construction, pressure oil is supplied into the clamping hydraulic chamber 222 to drive the clamp arm 204 in the clamping direction via the piston 221 to have the object to be clamped such as a die or work to be firmly held on the fixing plate P. In this clamped condition, even if the hydraulic pressure in the unclamping hydraulic chamber should drop, the clamping force holding spring 229 with its powerful spring force holds the clamp arm 4 at the extended clamping position A, hence the clamped condition of the object to be clamped such as a die is maintained. This clamping force holding spring 229 is required to have a large spring force. For instance, a clamp with a 10 ton capacity, the force required, which depends on the force magnifying ratio for the transmission from the piston 221 to the clamp arm 204, it is approx. 120~200 kgf when the force magnifying ratio is large, and approx. 400~600 kgf when the force magnifying ratio is small, these being by far exceeding 10~15 kgf that can be safely coped with by man power.

Hence, the following problems occur when the clamping force holding spring 229 is mounted or demounted.

(a) Mounting of the above-mentioned clamping force keeping spring 229 is generally carried out as follows. The piston 221 and the clamping force holding spring 229 are inserted one after the other into the clamping hydraulic chamber 222. Then, the rear end of the clamping force holding spring 229 is long projected behind the above-mentioned clamping hydraulic chamber 222. Now, a spring holding face 224*a* of the hydraulic chamber lid 224 is applied to the rear end of the clamping force holding spring 229, and by the aid of a press machine (not shown) with its large thrusting force the hydraulic chamber lid 224 is fitted to the rear end of the clamping hydraulic chamber 222 against the force of the clamping force holding spring 229.

A plurality of fixing bolts 233 are then used to secure the hydraulic chamber lid 224 to the peripheral wall 222*a* of the clamping hydraulic chamber 222.

Thus, in order to set the clamping force holding spring 229 incompressible by man power, the aid of a press machine is indispensable in order to have that spring compressed into the clamping hydraulic chamber 222, and this mounting procedure is quite troublesome.

(b) When this clamping force holding spring 229 and piston 221 are demounted, the fixing bolts 233 are loosened, while pressing the hydraulic chamber lid 224 with a press machine, and the hydraulic chamber lid 224 is allowed to gradually move back.

In this demounting procedure it is possible that the fixing bolts 223 are removed by mistake without using a press machine. Should it be the case, the hydraulic chamber lid 224 is catapulted back by the strong force of the spring 229 the moment the fixing bolts have been removed to possibly cause a serious injury. The U.S. Pat. No. 4,504,046 described above was also provided with the function described below in (3).

(3) When the clamp arm 204 is at the longitudinally extended or retracted position, the function to detect its position. (Hereinafter called "clamp arm's extended/retracted position detecting function.")

For that at least the clamping portion 204*c* of the clamp arm 204 is made to be movable longitudinally between the extended unclamping position C and the unclamping retracted position B, a pair of limit switches 207, 208 longitudinally arranged at a predetermined distance and, when the clamp arm 204 is at the extended unclamping position C, the front limit switch 207 is actuated by the actuating portion 235, while the clamp arm 204 is at the unclamping retracted position B, the rear limit switch 208 is actuated by the same actuating portion 235, and the position detection signals transmitted by these limit switches 207, 208 are used to control operation of injection molding machines or other machines.

The above-described arrangement, however, have the following defects (a) and (b).

(a) Since the limit switches 207, 208 are projected sideways from the rectangle-sectioned clamp housing 201, the overall width of the hydraulic clamp becomes inevitably large.

(b) Each limit switch 207/208 is directly turned on-off by the actuating portion 235 formed in the bottom of the clamp arm 204, its on-off timing cannot be fine-adjusted.

Although different in construction from the above-described U.S. Pat. No. 4,504,046 prior art disclosed in Japanese Laid-Open Utility Model Application No. 187422/'84 also relating to the clamp arm's extended/-retracted position detecting function, and is described with reference to FIGS. 11 and 12; parts having like functions are referred to by like numerals or signs.

In this prior art the limit switch 207 for detecting the extended position and the other limit switch 208 for detecting the retracted position are fixedly provided behind the clamp housing 201, and both limit switches 207, 208 are interlocked with the clamp arm 204 via a detection rod 238, and in a rear part of this detection rod 238 there are formed a switch actuating portion 239 for detection of the retracted position, a switch releasing groove 240 and another switch actuating portion 241 in this order toward the rear end. The above-mentioned switch releasing groove 240 is formed to be short, and the limit switch 208 for detection of the retracted position is located before the limit switch 207 for detection of the extended position. FIGS. 13 and 14 show improvements to the above-described Japanese reference proposed earlier by the present inventor, i.e. prior to the present invention; parts having like functions are referred to by like numerals or signs. The improvement shown in FIG. 13 has its switch releasing groove 240 formed longer. And the improvement shown in FIG. 14 is characterized in that each switch actuating portion 239/241 is made adjustable longitudinally before it is locked by each lock nut 242/243.

The above-described Japanese prior art (See FIGS. 11 and 12.) has the following defects.

(c) The solid line in FIG. 11 shows the condition in which the clamp arm 204 is at the unclamping retracted position B, and the limit switch 208 is turned on. Meanwhile the one-dot chain line shows the condition in which the clamp arm 204 is at the unclamping extended position C and the limit switch 207 for detection of the extended position is turned on.

In the transient period in which the clamp arm 204 moves from the unclamping retracted position B to the unclamping extending position C or vice versa both limit switches 208, 207 are turned on simultaneously as the switch releasing groove 240 is short. Then, the extended position detecting signal and the retracted position detecting signal are transmitted simultaneously.

Hence when the above-mentioned both signals are used for controlling the operation of injection molding machines or other machines, control errors caused by interference between these signals or machines controlled thereby can be precluded.

Now referring to the improvement shown in FIG. 13, this has its switch releasing groove 240 long, hence, with both limit switches 207, 208 being simultaneously turned off in the above-mentioned transient moving period, there is no risk of interference between both signals and machines controlled thereby, this being effective against control errors. This, however, gives rise to the following problems.

(d) Lengthening of the switch actuating groove 240 inevitably results in displacement of the actuating portion 241 for the switch detecting the extended position to eventually project largely rearward. This means a sizable increase of the overall length of the clamp. Moreover, the space occupied by the clamp on the fixing plate P becomes longer, hence the maximum dimensions of the object D that can be clamped to the fixing plate P such as a die or workpiece becomes smaller.

Meanwhile, the improvement shown in FIG. 14 has the advantage of the positions at which the limit switches 207, 208 are actuated are freely adjustable, but has the following defect.

(e) The actuating portion 239 for the switch for detecting the retracted position and its lock nut 242 are located quite deep to be difficultly accessible with fingers inserted from behind, and, worse, they are both difficult to adjust, the procedure being quite troublesome and low in the precision of adjustment.

SUMMARY OF THE INVENTION

The objects of the present invention are as follows.

(1) In a hydraulic clamp in which a clamp housing is retracted into a clamp housing at the time of unclamping to accomplish all of the following objects. First, to enable quick retraction of the clamp arm. Second, to decrease the longitudinal length of the clamp arm. Third, to make the clamp arm pushing spring compact. Fourth, to minimize the holding allowance for the object to be clamped such as a die, to minimize the transmission loss of the hydraulic clamp, to facilitate the machining of the piston rod and also to ensure against malfunction of the clamp arm. Fifth, to prevent damage to the clamp block, facilitate processing or machining of the clamp block and simplify the construction of the hydraulic clamp.

(2) Also, when the hydraulic clamp is additionally provided with a clamping force holding function, to enable mounting or demounting of the spring easily as well as safely.

(3) In case the hydraulic clamp is additionally provided with a clamp arm's extended/retracted position detecting function, first, to prevent increase of the overall length of the hydraulic clamp while decreasing the width thereof, second, to enable adjustment of the on-off timing of each limit switch easy and also improved in precision, third, to ensure against control errors due to simultaneous transmission of detection signal.

In order to accomplish the object described above in (1), the present invention relates to modification of the basic construction of the hydraulic clamp described in the U.S. Pat. No. 4,504,046, in which the mechanism for extending the clamp arm beyond the front end of the clamp housing by a clamp arm pushing spring is formed as follows.

The modification consists in that in at least either of the upper part of the clamp arm and the lower part of the piston rod, a spring receiving hole is made to extend longitudinally, into this spring receiving hole is inserted the clamp arm pushing spring, a spring base holding block for holding the rear end of the clamp arm pushing spring, is provided to be longitudinally extendable and retractable with respect to and accompanying the movement of the piston rod and a spring tip holding block holding the front end of the clamp arm pushing spring is provided at substantially same height as the spring base holding block, which extends and retracts accompanying the piston rod, and is longitudinally movable accompanying the clamp arm, the clamp arm pushing spring is set between the spring base holding block, which extends and retracts accompanying the piston rod and the spring tip holding block, which is located at substantially the same height therewith and extracts/retracts accompanying the clamp arm, and the above-mentioned engaging portion is provided at substantially same height as the clamp arm pushing spring.

In order to accomplish the object described in (2) above, the present invention also relates to the setting arrangement for the clamping force holding spring described above in connection with the U.S. Pat. No. 4,504,046.

The improvement consists in that the clamping force holding spring is held in a compressed condition at both ends thereof by the spring holding blocks provided at both ends of a freely extendable and retractable rod, and it is so dimensioned that the overall length of the freely extendable and retractable rod is a little longer than the maximum distance between the spring holding faces of the piston and hydraulic chamber lid respectively when the piston is extended forward or toward the clamping side to the limit and the freely extendable and retractable rod is fully extended.

Further, in order to accomplish the object described above under (3) the present invention includes the following improvement with regard to the method of detecting the extended and retracted position of the clamp arm described above in connection with the Japanese Laid-Open Utility Model Application No. 187422/'84.

That is, a switch actuating device is provided with a rod for detecting the extended position and a rod for detecting the retracted position, the rod for detecting the extended position is guided in the clamp housing to be freely movable within a range of the predetermined dimension, and it is pushed by a retraction spring, an input part for extension at the front end of the rod for detection of the extended position has opposed thereto from behind a clamp arm pushing actuator with a free-running distance or space in between to be engageable therewith for driving, a switch actuating portion at the rear end of the rod for detection of the extended position is disposed to be detachably in contact with a contactor of the limit switch for detection of the extended position from behind, a rod for detection of the retracted position is also guided in the clamp housing to be freely movable within a range of the predetermined dimension, and it is pushed forward with an extension spring, an input part for retraction at the front end of the rod for detection of the retracted position has opposed thereto from before a clamp arm pushing actuator with a free running distance or space in between to be engageable therewith for driving, and a switch actuating portion at the rear end of the rod for detection of the retracted position is disposed to be detachably in contact with a contactor of the limit switch for detection of the retracted position from before. The present invention with its structural features as described above have the following effects.

(1) In a hydraulic clamp arranged to have the clamp arm retracted into the clamp housing:

(a) since the clamp arm pushing spring does not act as resistance against retraction of the clamp arm, the hydraulic cylinder's driving force required for retraction is small, and it is possible to decrease the effective cross-sectional area of the piston in the unclamping hydraulic chamber to thereby increase extension/retraction speed of the piston for quick retraction of the clamp arm to enhance the efficiency of the clamping work;

(b) when the clamp arm is driven to retract, there is no risk of it being inclined by a strong force to be distorted thereby, hence there is no need of increasing the overall length of the clamp arm as an antidistortion measure, and the overall length of the clamp arm can thus be reduced. This results in decrease of the overall length of the clamp and possibly also that of the hydraulic clamp as a whole;

(c) the force pushing the clamp arm is far smaller with the clamp arm pushing spring of the present invention than with the prior art counterpart when it starts pushing, hence the clamp arm pushing spring can be made that much smaller;

(d) when the clamp arm is driven to the extended clamping position, the front end of the driving wedge remains inside of the clamp housing, and it is possible to have the clamping portion of the clamp arm alone extended beyond the front end of the clamp housing. The projecting length of the clamp arm is then small, and this means possible shortening of the holding allowance for clamping the object to be clamped such as a die;

(e) since the clamp arm is pivoted about its fulcrum portion to the clamping position, the frictional force that acts between the clamp housing's stopper and the clamp arm, hence the transmission loss of the hydraulic clamp, too, is small;

(f) the clamp arm is guided in the drive chamber of the clamp housing, hence there is no need of a guiding groove in the inclined face of the driving wedge and this means lowering of the manufacturing cost of the hydraulic clamp;

(g) since the driving wedge is always kept inside the clamp housing, foreign objects are prevented from getting in between the driving wedge and the clamp arm; this, in turn, ensures against malfunction of the clamp arm;

(h) with both driven face and clamping face or portion of the clamp arm located before the fulcrum portion, the force and the bending moment acting on the fulcrum portion are by far less than with the balance-type counterpart, hence prevented is the risk of clamp arm failure, and this means the possibility of safely driving the clamp arm more powerfully for higher clamping force; and (i) since the clamp arm is guided longitudinally in the drive chamber formed inside the clamp housing and consequently there is no need of forming a guide hole in it for straight-forward guidance thereof, processing such as machining of the clamp arm is easier; the clamp arm pushing spring is inserted into the spring receiving hole bored in the piston rod, hence a rod for holding the clamp arm pushing spring and pins for pivotally supporting this rod can be dispensed with, this resulting in less component parts of the hydraulic clamp and simpler construction thereof.

(2) When the hydraulic clamp is provided with the "clamping force holding function", there are also attained the following effects.

(a) The hydraulic chamber lid is not subjected to the pushing force of the clamping force holding spring, hence this lid can be manually fitted to the rear end of the clamping hydraulic chamber and can be secured by fastening means such as fixing bolts; therefore, the work of inserting the piston and closing the rear end of the hydraulic cylinder with the hydraulic chamber lid can be done by hand without the aid of a press machine, and can be done easily and efficiently.

(b) When the fastening means such as bolts or screws are sufficiently loosened for the hydraulic chamber lid to be removed from the clamp housing, the lid is no longer subjected to the pushing force of the clamping force holding spring, hence there is no risk of the hydraulic chamber lid being catapulted by the strong pushing force thereof to possibly cause a serious injury.

(3) When the hydraulic clamp is further provided with the "clamp arm's extended and retracted position detecting function", the following additional effects can be attained.

(a) When the clamp arm is retracting, first the first limit switch for detection of the extended position is turned off and then the rod for detection of the extended position as well as the actuating portion for the first switch for detection of the extended position are left and thereafter kept leaving there until the actuating portion for the second switch for detection of the retracted position completes one cycle of its work.

For this reason, there is no cause for the actuating portion for the first switch for detection of the extended position to project largely rearward, and the overall length of the clamp can be decreased.

(b) When access is taken from behind for adjustment of the actuating position, the actuating portion for the second switch for detection of the retracted position, too, is near the rear end, being thus readily accessible with fingers. Hence, adjusting procedure is facilitated and also adjusting precision is improved.

(c) When the clamp arm is moved from the extended position back to the retracted position, in the first portion of the retracting stroke the extended position detection signal alone is transmitted, in the middle portion neither the extended nor retracted position detection signal is transmitted and in the last portion the retracted position detection signal alone is transmitted. Conversely, when the clamp arm is moved forward from the retracted position to the extended position, in the first portion of the extending stroke the retracted position detection signal alone is transmitted, neither signal is transmitted in the middle portion and the extended position detection signal alone in the last portion. Thus, regardless of the direction of movement or shifting of the clamp arm between the extended position and the retracted position, there is no possibility of both limit switches being turned on simultaneously, this ensuring against control errors due to simultaneous transmission of the above-mentioned both signals.

BRIEF DESCRIPTION OF THE DRAWING

FIGS. 8 through 12 show prior arts and FIGS. 13 and 14 show the improvements made earlier by the present inventor about the prior arts, in which:

FIG. 1 through 5 show an embodiment of the invention, of which

FIG. 1 is a vertical sectional side view of a hydraulic clamp,

FIG. 2 is a sectional view taken along the line II—II of FIG. 1,

FIG. 3 is a diagram showing variation of the pushing force of a clamp arm pushing spring, FIG. 4 is a view showing the hydraulic clamp at the extended clamping position, and FIG. 5 is a partial sectional view of the hydraulic clamp provided with a clamping force holding spring.

FIG. 6 is a partial view of the hydraulic clamp of another embodiment of the present invention, substantially corresponding to FIG. 1.

FIG. 7 is a like partial view of the hydraulic clamp of still another embodiment of the present invention, substantially corresponding to FIG. 1.

FIGS. 8 through 10 show a prior art 1, of which

FIG. 8 is a vertical sectional side view of the hydraulic clamp,

FIG. 9 a partially sectioned plan view of the hydraulic clamp, and

FIG. 10 is a diagram showing variation of the pushing force of the clamp arm pushing spring.

FIG. 12 is a sectional view taken along the line XII—XII of FIG. 11.

FIG. 13 shows an improvement made earlier by the present inventor, the view being substantially corresponding to FIG. 12.

FIG. 14 shows another improvement made earlier by the same, the view being also substantially corresponding to FIG. 12.

DESCRIPTION OF THE PREFERRED EMBODIMENT

The present invention will become more fully understood from the following description of some preferred embodiments thereof, which is to be taken in conjunction with the accompanying drawings. It should be clearly understood, however, that the description of the embodiments, and the drawings, are all provided purely for the purpose of illustration and exemplification only, and are in no way to be taken as limitative of the scope of the present invention.

Referring to FIGS. 1 through 5, an embodiment of the present invention is described below.

Figure 1:
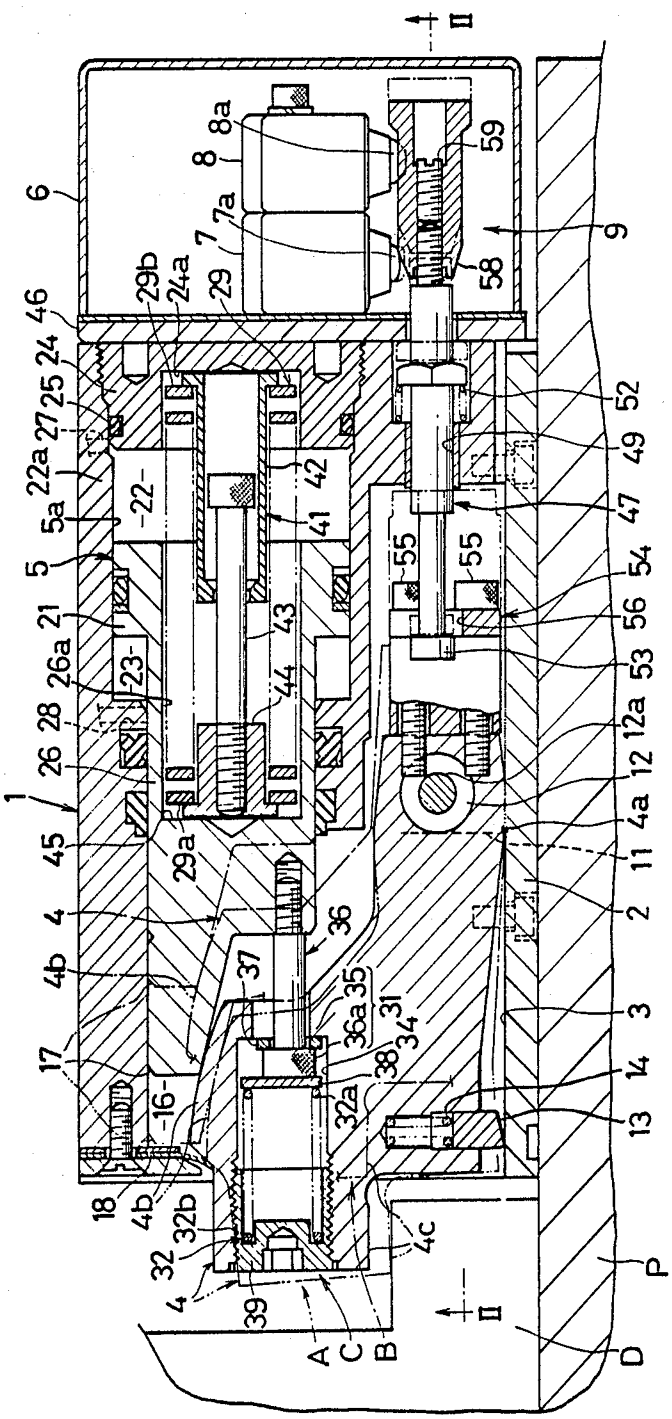
FIGS. 1 through 7 show embodiments of the present invention.

In FIG. 1 P represents a die-fixing plate of an injection molding machine or the like and a die D placed on it is fixedly secured thereto by means of hydraulic clamps. This hydraulic clamp is basically designed to produce a clamping force through magnification of a hydraulic force by means of a wedge mechanism.

Figure 2:
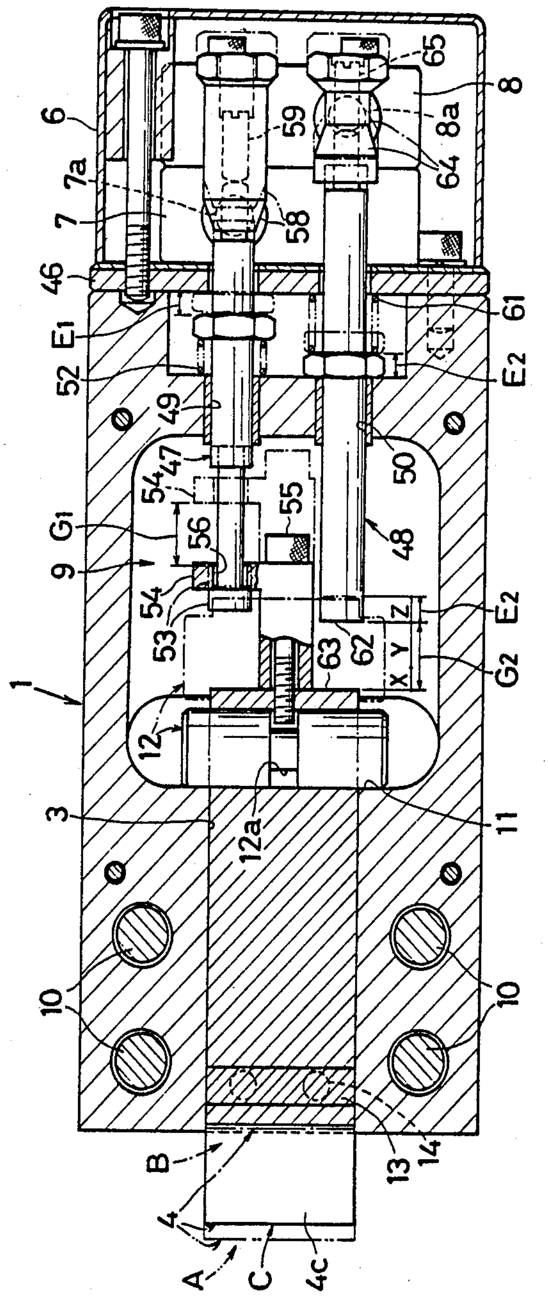
Figure 3:
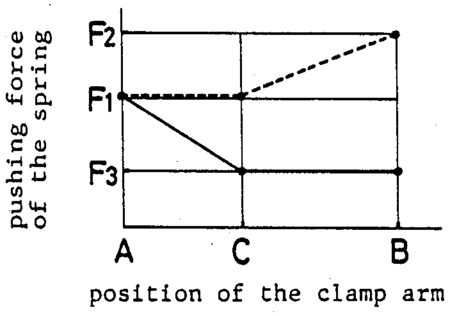

In FIGS. 1 and 2 reference numeral 1 designates a clamp housing of a hydraulic clamp and reference numeral 2 designates its bottom plate, and in the clamp housing 1 there is formed a drive chamber 3 with its front end open. In the front part (on the left side in the figure) of the drive chamber 3 a claw-shaped clamp arm 4 is inserted to be freely movable longitudinally and vertically pivotable and in the rear part (on the right side in the figure) thereof a hydraulic cylinder 5 for driving the clamp arm 4 is installed. Behind the clamp housing 1 (on the right side in the figure) a limit switch casing 6 is connected thereto and in this limit switch casing 6 are provided a first limit switch 7 for detecting the extended position of the clamp arm 4 and a second limit switch 8 for detecting the retracted position thereof. And these two limit switches 7, 8 are interlocked with the clamp arm via a switch actuating device. By the way, the clamp housing 1 is fixedly secured to the fixing plate P by means of bolts 10 one pair each (=4) on the left and right sides as shown in FIG. 2.

First explained is the above-mentioned clamp arm 4.

The clamp arm 4 is inserted in the drive chamber 3 to be freely movable longitudinally within a given range or stroke whose front end is limited by a stopper 11 disposed in the longitudinally middle part of the clamp arm 1. There is also provided a mating shaft 12 laterally through the rear part of the clamp arm 4, and forward movement of the clamp arm 4 is checked when this mating shaft 12 has come into contact with the stopper 11. In the bottom near the rear end of the clamp arm 4 there is provided a fulcrum portion 4*a* and about this fulcrum portion 4*a* the clamp arm 4 is freely pivotable vertically with respect to the bottom plate 2. Further, a driven face 4*b* is formed in the front top of the clamp arm 4 and a clamping face 4*c* in the projected front bottom thereof which is the pivoting end portion. Near the front end of the bottom of the pivotable clamp arm 4, a scraper 13 is inserted in a mating hole to be freely slidable vertically and pushed downward i.e. toward the bottom plate 2 by a return spring 14.

Between the above-mentioned driven face 4*b* of the clamp arm 4 and the top of the drive chamber 3 there is formed a wedge-shaped space 16 with its bottom sloped up toward the front end and into this wedge-shaped space 16 a driving wedge 17 is inserted from behind. This driving wedge 17 is interlockingly connected with the above-mentioned hydraulic cylinder 5. The clamp arm 4 is constantly pushed upward by the return spring and its top is in contact with another scraper 18 made of sheet spring.

Then explanation is made of the above-mentioned hydraulic cylinder 5.

In the rear upper part of the clamp housing 1 there is formed a longitudinally extending cylindrical chamber 5*a*, into this cylinder chamber 5*a* a piston 21 is inserted oiltight to be freely slidable. Behind the piston 21 is formed a clamping hydraulic chamber 22 and in front thereof an unclamping hydraulic chamber 23. These hydraulic chambers 22, 23 have opening therein pressure oil supply/discharge ports 27, 28 respectively.

The above-mentioned clamping hydraulic chamber 22 has its rear end (on the right side in the figure) open, and this open end is closed oiltight by a hydraulic chamber lid 24 which is screwed in with an "O" ring 25 set thereon. This hydraulic chamber lid 24, however, may as well be secured to the open end of the hydraulic chamber 22 by the use of bolts or snap rings instead of screwing into the peripheral wall 22*a* thereof. Meanwhile, a cylindrical piston rod 26 is formed to extend forward from the front face of the piston 21 and this is inserted into the clamp housing 1 oiltight to be freely slidable therein. This piston rod 26 has integrally formed therewith up in front thereof the above-mentioned driving wedge 17. In the clamping hydraulic chamber 22 there is set a clamping force holding spring 29 between the end wall of a cylindrical hole 26*a* in the piston rod 26 and the hydraulic chamber lid 24, the inner wall thereof. And the driving wedge 17 is kept constantly pushed forward by this clamping force holding spring 29.

An engaging portion 31 for causing the clamp arm 4 to retract after the driving wedge 17 has withdrawn by a predetermined dimension is provided to engage the piston rod 26 with the clamp arm 4, and there is also provided a clamp arm pushing spring 32 for keeping this clamp arm 4 pushed forward.

For that, a longitudinally extending spring receiving hole 34 is formed in the upper part of the clamp arm 4 and at the rear end of this spring receiving hole 34 there is provided a stepped portion 35 which reduces the diameter of the hole there. The spring receiving hole 34 has inserted thereinto a bolt-like engaging rod 36. The leg of this engaging rod 36 is screwed tight into the mating tapped hole in the lower front part of the piston rod 26, while the head 36*a* of the engaging rod 36 is arranged to be possibly in contact with the stepped portion 35 of the spring receiving hole 34 via the engaging piece 37. The above-mentioned stepped portion 35 and the head 36*a* of the engaging rod 36 comprise the engaging portion 31 mentioned above. In the above-mentioned spring receiving hole 34 the clamp arm pushing spring 32 consisting of a compression coil spring is set between the clamp arm 4 and the engaging rod 36. That is, a spring base holding disc 38 is inserted between the base (rear end) 32*a* of the clamp arm pushing spring 32 and the head 36*a* of the engaging rod 36. Meanwhile, the tip (front end) 32*b* of the clamp arm pushing spring 32 is held by a spring tip holding block 39 screwed tight into the threaded front part of the spring receiving hole 34. By this arrangement the spring base holding disc 38 follows the movement of the piston rod 26 as it extends, the clamp arm pushing spring 32 is then pushed by the spring base holding disc 38, and the clamp arm 4 is pushed forward by this spring force. As the piston rod 26 further moves forward, the head 36*a* of the engaging rod 36 pushes the clamp arm pushing spring 32 to compress it via the spring base holding disc 38, while the clamp arm 4 is checked by the stopper 11 via the above-mentioned mating shaft 12, hence the driving wedge 17 moves forward relative to the clamp arm 4 and the clamp arm 4 is forced down to the extended clamping position A (shown by the two-dot chain line). When the piston rod 26 is retracted from the above-mentioned position, the driving wedge 17 moves back relative to the clamp arm 4 which is kept pushed forward by the force of the clamp arm pushing spring 32, this resulting in releasing of the driven face 4*b* of the clamp arm 4 with simultaneous pivoting upward of the clamp arm 4 by the force of the return spring 14 to the extended unclamping position C (shown by the solid line in the figure). As the piston rod 26 further retracts, the head 36a of the engaging rod 36 comes into contact with the stepped portion 35 via the engaging piece 37, the clamp arm 4 retracts to the unclamping retracted position B (shown by the one-dot chain line) with its clamping face or portion 4c, too, retracted to be inward of the front end face of the drive chamber 3.

As the clamp arm 4 is moved from the extended clamping position A through the extended unclamping position C to the unclamping retracted position B, the clamp arm pushing spring 32 acts as follows.

First, while the clamp arm 4 moves from the extended clamping position A to the extended unclamping position C, the clamp arm pushing spring 32 extends as the driving wedge 17 moves back relative to the clamp arm 4, and this extended condition remains unchanged as the clamp arm 4 moves from the extended unclamping position C to the unclamping retracted position B, for during this period the position of the driving wedge 17 relative to that of the clamp arm 4 remains unchanged. Then, the pushing force of the clamp arm pushing spring 32 varies as shown by the solid line in the diagram of FIG. 3. It is at the anti-frictional dragging level $F_1$ when the clamp arm 4 is at the extended clamping position A. This anti-frictional dragging level $F_1$ is required to ensure against the clamp arm 4 being moved back by the frictional force resulting from retraction of the driving wedge 17 from the position corresponding to the clamp arm's extended clamping position A to that corresponding to the latter's extended unclamping position C. While the clamp arm 4 moves from the extended clamping position A to the extended unclamping condition C, the pushing force of the clamp arm pushing spring 32 decreases gradually as the spring extends to the clamp arm pushing level $F_3$. Thereafter, until the unclamping retracted position B is reached, the clamp arm pushing level $F_3$ remains unchanged since the length of the spring is kept constant.

With the hydraulic clamp of the present invention, the clamp arm pushing level $F_3$ is lower than the anti-frictional dragging level $F_3$ and is by far lower than the clamp arm pushing start level $F_2$ with the Japanese Laid-Open Utility Model Application No. 187422/'84 counterpart described above, hence the clamp arm pushing spring 32 may be made that much smaller or more compact.

Since the clamp arm pushing spring 32 has its length remaining constant between the piston rod 26 and the clamp arm 4 while the clamp arm 4 retracts from the extended unclamping position C to the unclamping retracted position B, it presents no resistance to retraction of the clamp arm 4. Hence, the hydraulic force required for its retraction is smaller and the cross-sectional area of the unclamping hydraulic chamber 23 of the hydraulic cylinder 5 can be reduced and, consequently, the unclamping speed of the piston 21 can be increased relative to the pressure oil supply rate to the unclamping hydraulic chamber 23, and thus quick withdrawal of the clamp arm 4 to the unclamping retracted position B is feasible.

With the clamp arm 4, the height at which it is pushed forward by the clamp arm pushing spring 32 and the height at which it is pulled rearward via the engaging portion 31 are substantially the same, hence there is no risk of it being forced to incline to be eventually distorted and the clamp arm 4 can be caused to retract smoothly by a very small hydraulic force.

Hence, it is not necessary to increase the overall length of the clamp arm 4 and make the guide ratio higher in order to prevent inclination-induced distortion, and thus the overall length of the clamp arm 4 can be reduced.

Figure 5:
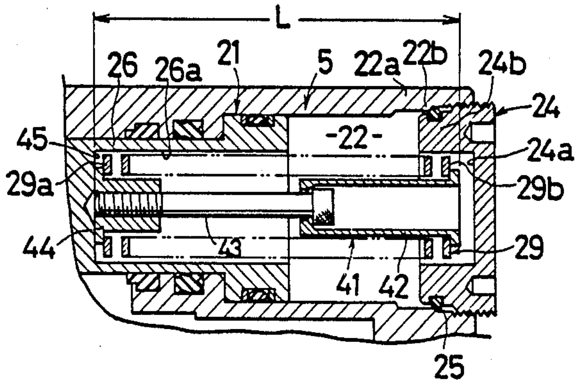
Figure 4:
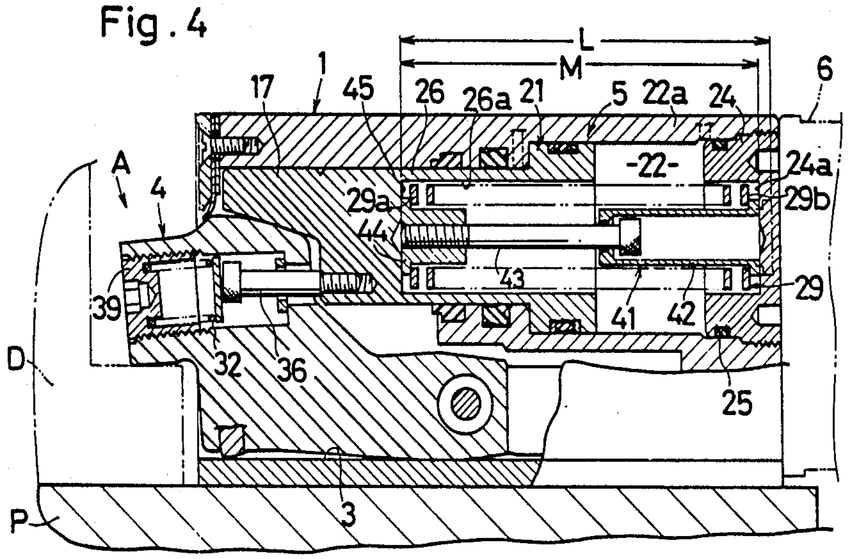

Referring to FIGS. 4 and 5, now explained is the above-mentioned clamping force holding spring 29. The clamping force holding spring 29 is set in the clamping hydraulic chamber 22 preassembled with a freely extendable and retractable rod 41, and its function is to keep the clamp arm 4 at the extended clamping position A, pushing forward the driving wedge 17, even in the event of drop of the hydraulic pressure in the hydraulic chamber 22 due to e.g. oil leakage.

The above-mentioned freely extendable and retractable rod 41 is composed of a cylindrical spring holding block 42, a slide shaft 43 inserted into the cylindrical spring holding block 42 to be freely slidable longitudinally therein within a predetermined stroke and another spring holding block 44 screwed onto the front end of the slide shaft 43. Between both spring holding blocks 42, 44 the clamping force holding spring 29 with its both ends 29a, 29b is set in a compressed condition. The front spring holding block 44 is held, in turn, by a spring holding face 45 formed in the end wall of a cylindrical hole 26a bored in the piston rod 26, while the rear spring holding block 42 is held, in turn, by another spring holding face 24a formed in the bottom wall of the hydraulic chamber lid 24. And, as shown in FIG. 4, when the piston 21 is at the front end of its stroke, it is so designed that the overall length L of the freely extendable and retractable rod 41 fully extended (See FIGS. 4 and 5.) is a little more than the maximum distance M between the front spring holding face 45 and the rear spring holding face 24a.

According to the present invention, the clamping force holding spring 29 is installed in the following procedure.

The above-mentioned clamping force holding spring 29 is preassembled with the freely extendable and retractable rod 41 by the aid of a press machine with the spring compressed to the dimension L in overall length.

As seen from FIG. 5, first the piston 21 and the clamping force holding spring 29 preassembled with the freely extendable and retractable rod 41 are inserted into the clamping hydraulic chamber 22 in this order to the inner end of the chamber. Then the rear open end of the hydraulic chamber 22 is closed with the hydraulic chamber lid 24. At this stage the hydraulic chamber lid 24 is not yet in contact with either clamping force holding spring 29 or freely extendable and retractable rod 41.

Thereafter, the hydraulic chamber lid 24 is screwed into the peripheral wall 22a of the hydraulic chamber 22. Then, first an "O" ring 25 set in a mating groove in a front portion 22b of the hydraulic chamber lid 24 rides over a stepped portion provided in the rear peripheral wall of the hydraulic chamber 22. Now the hydraulic chamber lid 24 comes into contact with the freely extendable and retractable rod 41 or the clamping force holding spring 29 and is then secured to the peripheral wall 22a with the clamping force holding spring 29 compressed.

To demount the clamping force holding spring 29 and the piston 21, it suffices to simply loosen or unscrew the hydraulic chamber lid 24. As it is unscrewed, the clamping force holding spring 29 is restrained by the freely extendable and retractable rod 41 to be L in overall length. This means that when the hydraulic chamber lid 24 is fully unscrewed it is already apart from both clamping force holding spring 29 and freely extendable and retractable rod 41 and can be safely removed without any risk of the lid 41 being catapulted by the force of the clamping force holding spring 29. The clamping force holding spring 29 and the piston 21 may then be taken out.

In the course of screwing-in the hydraulic chamber lid 24, the hydraulic chamber lid 24 is not yet subjected to the force of the clamping force holding spring 29 when the "O" ring 25 on the front supporting portion 24*a* of the hydraulic chamber lid 24 rides over the stepped portion 22*b* in the rear peripheral part of the clamping hydraulic chamber 22, hence the hydraulic chamber lid 24 can be easily screwed in by hand. If the "O" ring 25 should then be caught by the stepped portion 22*b* in the rear peripheral wall of the clamping hydraulic chamber, it can be felt by the worker and damage to the "O" ring 25 and subsequent possible oil leakage can be precluded by once loosening the hydraulic chamber lid 24 before making a re-screwing attempt.

If the above-mentioned clamping force holding spring 29 in the clamping hydraulic chamber 22 should be dispensed with, the present embodiment still has the following advantages.

Figure 8:
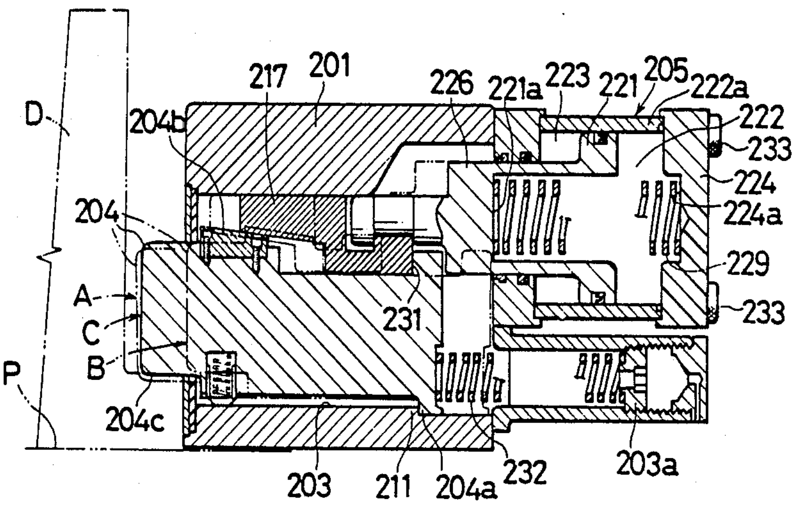
Fig. 8 PRIOR ART
Figure 9:
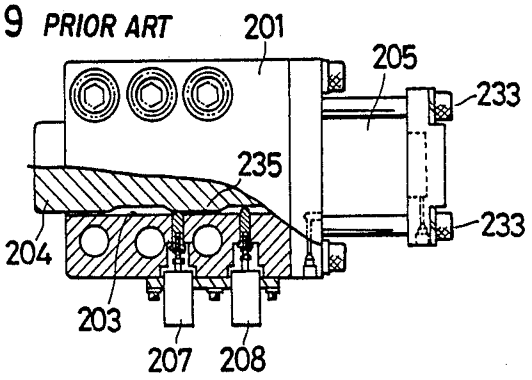
Fig. 9 PRIOR ART
Figure 10:
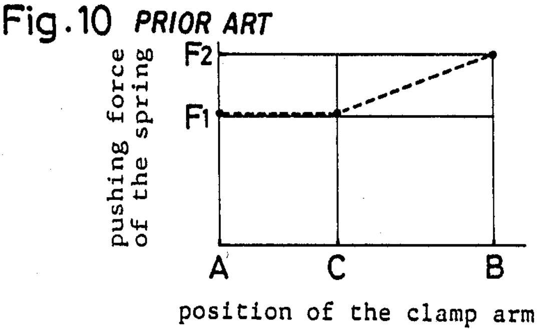
Fig. 10 PRIOR ART
Figure 11:
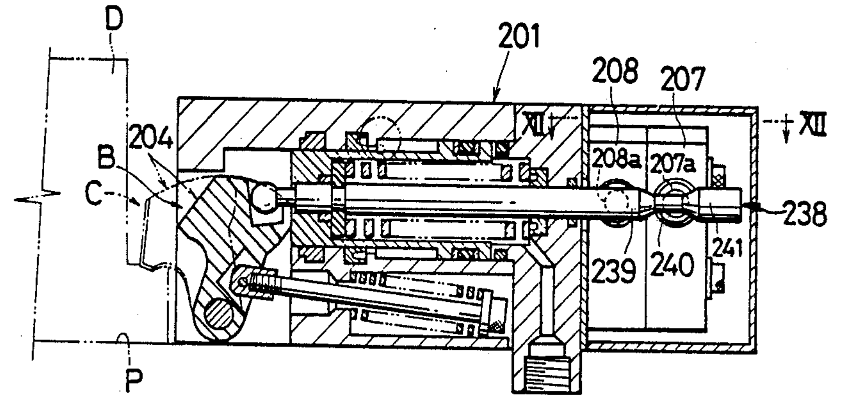
Fig. 11 PRIOR ART
Figure 12:
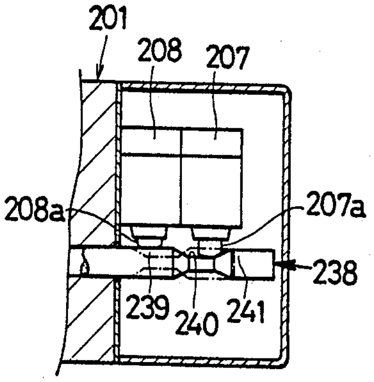
Fig. 12 PRIOR ART
Figure 13:
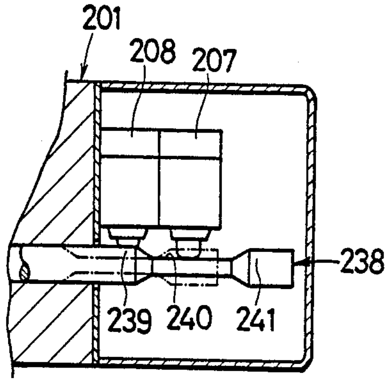
Fig. 13 PRIOR ART
Figure 14:
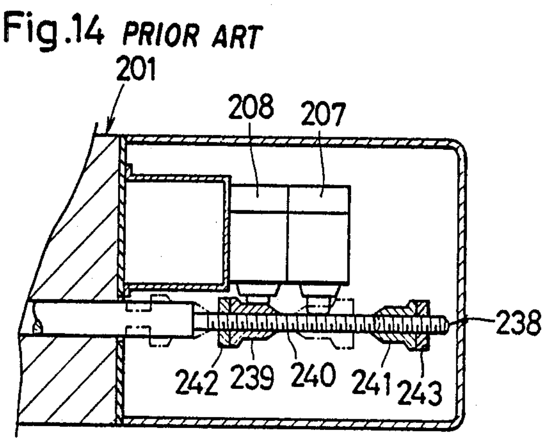
Fig. 14 PRIOR ART

In the U.S. Pat. No. 4,504,046 shown in FIGS. 8 and 9, if the pressure oil is discharged from the unclamping hydraulic chamber 223 with the clamp arm 204 at the unclamping retracted position B, the clamp arm 204 being pushed forward by the clamp arm pushing spring 232, the clamp arm 204 is extended to project beyond the front end of the drive chamber 203. In order to prevent this, the clamping hydraulic chamber 223 has to be constantly supplied with pressure oil. According to the clamp arm pushing spring 32 of this embodiment, however, if the pressure oil is discharged from the unclamping hydraulic chamber 23, with the clamp arm 4 at the unclamping retracted position B, the force of the clamp arm pushing spring 32 does not act pushing the clamp arm 4, hence the clamp arm 4 is kept at the retracted position, and the defect of the U.S. Pat. No. 4,504,046 is thus overcome.

Now described below is the actuation device for both, first and second, limit switches 7, 8 for detecting the extended and the retracted positions of the clamp arm, mainly referring to FIG. 2. This device is provided with a first rod 47 for detecting the extended position and a second rod for detecting the retracted position, and these two detection rods 47, 48 are arranged side by side at substantially the same height. The first rod 47 for detection of the extended position passes longitudinally passes through the plate 46 secured to the housing 1 from behind and is guided by the guide hole 49 provided in the rear lower part of the clamp housing 1 to be longitudinally movable freely within a range of the predetermined dimension $E_1$, and is pushed rearward by a retraction spring 52. Meanwhile, behind the clamp arm 4 an extension actuator 54 L-shaped in the bottom view is fixed by means of fixing bolts 55, 55. Behind the extension actuator 54 is formed an engaging groove 56, and into this engaging groove 56 the tip portion of the first rod 47 for detection of the extended position is inserted. Also, the leg of the fixing bolt 55 fits in the peripheral groove 12*a* of the stopper's mating shaft 12 and the axial displacement of the stopper's mating shaft 12 is thereby restrained.

When the clamp arm 4 is at the unclamping retracted position B (shown by the one-dot chain line in FIG. 2), the rear side of an input part for extension 53 at the front end of the first rod 47 for detecting the extended position has opposed thereto from behind the front side of the extension actuator 54 at a first free running distance $G_1$ to be engagable therewith. The rear end of the first rod 47 for detecting the extended position has screwed thereon a switch actuator 58 to be adjustable longitudinally, and this switch actuator 58 is detachably in contact with a contactor 7*a* of a first limit switch 7 for detection of the extended position. The switch actuator 58 is locked by a lock bolt 59. When the clamp arm 4 is driven by the hydraulic cylinder 5 to move forward from the above-mentioned unclamping retracted condition B (shown by the one-dot chain line) to the extended unclamping position C (shown by the solid line), the extension actuator 54 extends the first rod 47 for detecting the extended position via the input part for extension 53, and the switch actuator 58 pushes in the contactor 7*a* of the first limit switch 7 for detection of the extended position.

A second rod 48 for detecting the retracted position passes longitudinally the above-mentioned plate 46 and is guided by a guide hole 50 provided in the rear lower part of the clamp housing 1 to be longitudinally movable freely within a range of the predetermined dimension $E_2$, and is pushed forward by an extension spring 61. Meanwhile, an retraction actuator 63 is formed in the rear end of the clamp arm 4.

When the clamp arm 4 is at the extended unclamping position C (shown by the solid line in the figure), an input part 62 for retraction at the front end of the second rod 48 for detecting the retracted position has opposed thereto from before a retraction actuator 63 at a second free running distance $G_2$ to be engageable therewith. The rear end of the second rod 48 for detecting the retracted position has screwed thereon a switch actuator 64 to be adjustable longitudinally, and this switch actuator 64 is detachably in contact with a contactor 8*a* of a second limit switch 8 for detection of the retracted position. The switch actuator 64 is locked by a lock bolt 65.

When the clamp arm 4 is driven by the hydraulic cylinder 5 to move rearward from the above-mentioned unclamping extended position C (shown by the solid line) to the unclamping retracted position B (shown by the one-dot chain line), the retraction actuator 63 pushes back the second rod 48 for detection of the retracted position via the input part 62 for retraction, and the switch actuator 64 pushes in the contactor 8*a* of the second limit switch 8 for detection of the retracted position.

The clamp arm's extended/retracted position detecting device of the above-described construction acts as follows.

In FIGS. 1 and 2 the solid line indicates the position of the clamp arm 4 when it is at the extended unclamping position C with the first limit switch 7 for detection of the extended position only turned on, while the one-dot chain line indicates the position of the same when it is at the retracted unclamping position B with the second limit switch 8 only turned on.

Now, it is supposed that the clamp arm 4 is moved rearward from the extended unclamping position C shown by the solid line to the retracted unclamping position B shown by the one-dot chain line.

Then, as shown in FIG. 2, in the first stage X of retraction, the first rod 47 for detection of the extended position is pushed back by the retraction spring 52 as the extension actuator 54 moves rearward, and the contactor 7*a* is released by the switch actuator 58 for detection of the extended position and the first limit switch 7 for detection of the extended position is turned off.

In the middle stage Y of retraction, the extension actuator 54 starts moving off the input part 53 for extension with the first rod 47 for detection of the extended position and the switch actuator 58 for detection of the extended position left in the same positions, hence the first limit switch 7 for detection of the extended position is kept off. In this stage, since the retraction actuator 63 is not yet in contact with the input part for retraction 62, the second rod 48 for detection of the retracted position and the switch actuator 64 for detection of the retracted position are pushed forward by the extension spring 61, and the limit switch 8 for detection of the retracted position is kept off.

And in the last stage Z of retraction, the retraction actuator 63 starts pushing the input part for retraction 62 to cause the second rod 48 for detection of the retracted position to move rearward against the force of the extension spring 61, hence the switch actuator 64 for detection of the retracted position pushes in the contactor 8*a* to turn on the second limit switch 8 for detection of the retracted position.

Thus, in the first stage X of retraction of the clamp arm 4, the extended position detection signal only is transmitted, neither extended nor retracted position detection signal is transmitted in the middle stage Y, and the retracted position detection signal only is transmitted in the last stage Z.

When the clamp arm 4 is moved forward from the unclamping retracted position B to the unclamping extended position C, the progress is simply reversed. That is, in the first stage of extension the retracted position detection signal only is transmitted, neither signal is transmitted in the middle stage, and the extended position detection signal only is transmitted in the last stage.

Hence, regardless of the direction in which the clamp arm 4 moves between the extended unclamping position C and the unclamping retracted position B, there is no possibility of the first limit switch 7 for detection of the extended position and the second limit switch 8 for detection of the retracted position being turned on simultaneously.

Figure 6:
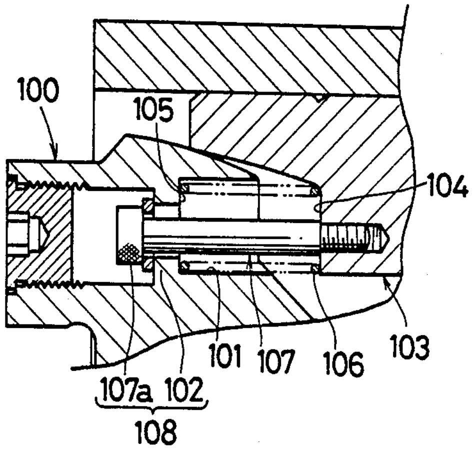

FIG. 6 is a partial view of a hydraulic clamp showing another embodiment of the present invention, being different in construction from the embodiment described above. In this embodiment a stepped portion 102 is formed in the longitudinally middle part of a spring receiving hole 101 bored in a clamp arm 100. In the front end of a piston rod 103 a spring base holding face 104 and the rear side of a stepped portion 102 serves as a spring tip holding face 105. And a clamp arm pushing spring 106 consisting of a compression coil spring is set between the above-mentioned both spring holding faces 104, 105. There is also provided an engaging portion 108 consisting of the head **107*a* of an engaging rod 107 and a stepped portion 102**.

Figure 7:
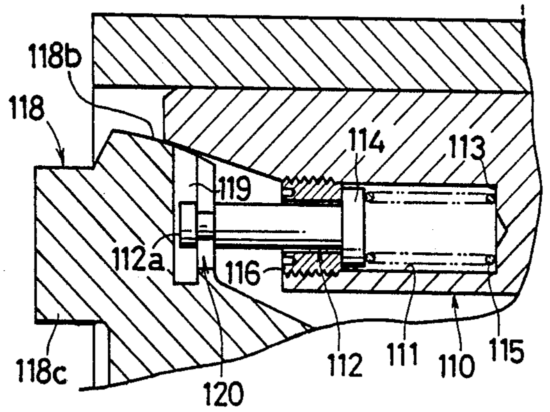

FIG. 7 is another embodiment of the present invention. In this embodiment the rear part of an engaging rod 112 is inserted longitudinally slidably into a spring receiving hole 111 bored rearward from the front end of a piston rod 110. A clamp arm pushing spring 115 consisting of a compression coil spring is set between a spring base holding face 113 formed in the end wall of the spring receiving hole 111 and a spring tip holding face 114 formed on the rear side of the engaging rod 112. The spring tip holding face 114 of the engaging rod 112 has the front end of its stroke limited by a screwed-in stopper 116. Meanwhile, a vertically extending engaging groove 119 is formed in the upper part of a clamp arm 118, and in this engaging groove the head **112*a* of the engaging rod 112 is fitted to be slidable therein. The rear wall of the above-mentioned engaging groove 119 and the head 112*a* of the engaging rod 112 comprise an engaging portion 120. In this embodiment the part of the clamp arm 118 between a driven face 118*b* and a clamping face or portion 118*c* is formed to be solid, this resulting in an improved mechanical strength of the clamp arm 118**.

Although in the above-mentioned embodiments the spring arm pushing spring is described to consist of a compression coil spring, it may also consist of a tension coil spring for pushing forward the clamp arm relative to the piston rod, allowing pivoting of the clamp arm.

What is claimed is:

1. A hydraulic clamp, comprising:

a clamp housing;

a drive chamber formed in said clamp housing with its front end open;

a clamp arm inserted in said drive chamber to be freely movable longitudinally and vertically pivotable; and a hydraulic cylinder provided in the upper rear part of said clamp housing, wherein a fulcrum portion is formed at a rear end part of said clamp arm, a driven face in a front top part and a clamping portion in a front bottom part of said clamp arm, respectively, a stopper for stopping said clamp arm at the front end of its stroke is fixedly provided in said clamp housing and a driving wedge is inserted from behind into the space defined by said driven face and the top of said drive chamber, said driving wedge is made longitudinally drivable by a piston rod of said hydraulic cylinder, an engaging portion for causing said clamp arm to retract after said driving wedge has withdrawn by a predetermined dimension is provided to engage said piston rod and said clamp arm, a spring receiving hole is formed to extend longitudinally in at least either of the upper part of said clamp arm and the lower part of said piston rod and a clamp arm pushing spring is inserted into said spring receiving hole, a spring base holding means for holding the rear end of said clamp arm pushing spring is provided to be movable longitudinally accompanying said piston rod, a spring tip holding means for holding the front end of said clamp arm pushing spring is provided to be longitudinally movable accompanying said clamp arm at a height substantially the same as that of said spring base holding means longitudinally movable accompanying said piston rod, and said clamp arm pushing spring is set between said spring base holding means longitudinally movable accompanying said piston rod and said spring tip holding means longitudinally movable accompanying said clamp arm both being substantially the same in height, said engaging portion is provided at substantially the same height as said clamp arm pushing spring, and it is so arranged that said clamp arm is kept pushed forward by said clamp arm pushing spring and, when said hydraulic cylinder is driven to extend, said clamp arm is moved forward by said clamp arm pushing spring and, after it is stopped by said stopper with its clamping portion projecting beyond the front end of said drive chamber, said driven face is forced down by said driving wedge of the extended clamping position to be reached, and wherein when said hydraulic cylinder is driven to retract, said driving wedge withdraws to release said driven face with said clamp arm kept extended by said clamp arm pushing spring, and then said piston rod pulls back said clamp arm via said engaging portion to the unclamping retracted position with its clamping portion retracted to be inward of the front end of said drive chamber.

2. A hydraulic clamp as recited in claim 1, wherein said spring receiving hole is formed in said clamp arm.

3. A hydraulic clamp as recited in claim 2, wherein a stepped portion is formed at the rear end of said spring receiving hole with its diameter reduced, an engaging rod is provided to project forward from said piston rod, the head of said engaging rod being inserted into said spring receiving hole to be longitudinally movable freely within a given stroke, said spring base holding means held by the head of said engaging rod, the front wall of said spring receiving hold used as said spring tip holding means, and said engaging portion includes the head of said engaging rod and said stepped portion.

4. A hydraulic clamp as recited in claim 2, wherein the longitudinally middle part of said spring receiving hole is reduced in diameter to form the stepped portion and said engaging rod is provided to project forward from said piston rod, the head of said engaging rod being inserted into the front part of said spring receiving hole to be longitudinally movable freely within a given range, said spring base holding means formed in the front end of said piston rod and the rear end of said stepped portion used as said spring tip holding means, and said engaging portion includes the head of said engaging rod and the front wall of said stepped portion.

5. A hydraulic clamp as recited in claim 1, wherein said spring receiving hole is formed in said piston rod, the rear end of said engaging rod being inserted into said spring receiving hole to be longitudinally movable freely therein within a given range, said spring base holding means formed in the rear end wall of said spring receiving hole and said spring tip holding means in the rear end of said engaging rod respectively, and said engaging portion including the rear end of said clamp arm and the front end of the engaging rod.

6. A hydraulic clamp, comprising a clamp arm, a hydraulic cylinder connected for driving said clamp arm toward a clamping side of the clamp, a clamping force holding spring located in a clamping hydraulic chamber of said hydraulic cylinder in a compressed and deformed condition between a hydraulic chamber lid and a piston, said clamping force holding spring operating to maintain said clamp arm at an extended clamping position via said piston, wherein said clamping force holding spring with its both ends is set in a compressed condition between front and rear spring holding means provided respectively at both ends of a freely extendable and retractable rod and is so dimensioned that the fully extended overall length of said freely extendable and retractable rod is slightly larger than the maximum distance between spring holding faces of said piston and said hydraulic chamber lid, respectively, when said piston is extended to the foremost clamping position.

7. A hydraulic clamp as recited in claim 6, wherein said rear spring holding means is generally cylindrical and inserted into the rear portion of said clamping hydraulic chamber, a slide shaft inserted into said rear spring holding means to be freely slidable longitudinally therein within a given range and said front spring holding means is so arranged that said front spring holding means is held by a spring holding face formed in the bottom wall of a cylindrical hole of said rod and said rear spring holding means is held by the spring holding face formed in the bottom wall of said hydraulic chamber lid.

8. A hydraulic clamp as recited in claim 6 or 7, wherein said hydraulic chamber lid is screwed oiltight into the inner peripheral part toward the open rear end of a peripheral wall of said clamping hydraulic chamber.

9. A hydraulic clamp comprising a clamp arm, a clamp housing with said clamp arm housed therein, a hydraulic cylinder provided in a rear part of said clamp housing, a clamping portion of said clamp arm being longitudinally movable in either direction between an extended unclamping position and an unclamping retracted position by means of the hydraulic cylinder, a first limit switch for detection of the extended position of said clamp arm and a second limit switch for detection of the retracted position being fixedly provided behind said clamp housing with these limit switches interlocked with said clamp arm via a switch actuating device, wherein said switch actuating device comprises a first rod for detection of the extended position and a second rod for detection of the retracted position, said first rod for detection of the extended position being guided in said clamp housing to be longitudinally movable freely with a first given range and pushed rearward by a retraction spring, an extension input part provided at a front end of said first rod for detecting the extended position having opposed thereto an extension actuator of said clamp arm engageable therewith from behind at a first free running distance, a first switch actuating portion provided at the rear end of said first rod for detection of the extended position and located to be detachably in contact with a contactor of said first limit switch for detection of the extended position from behind, said second rod for detection of the retracted position being guided in said clamp housing to be longitudinally movable freely within a second given range and being pushed forward by an extension spring, a retraction input part provided at the front end of said second rod for detecting the retracted position having forwardly located therefrom a retraction actuator of said clamp arm engageable therewith from a second free running distance, and a second switch actuating portion provided at the rear end of said second rod for detection of the retracted position being located to be detachably in contact with a contactor of said second limit switch for detection of the retracted position.

* * * * *